June 28, 1927.

H. C. HUBBELL 1,633,743

TRACTOR

Filed March 10, 1922

INVENTOR
Harvey C. Hubbell
By James N. Ramsey
ATTORNEY

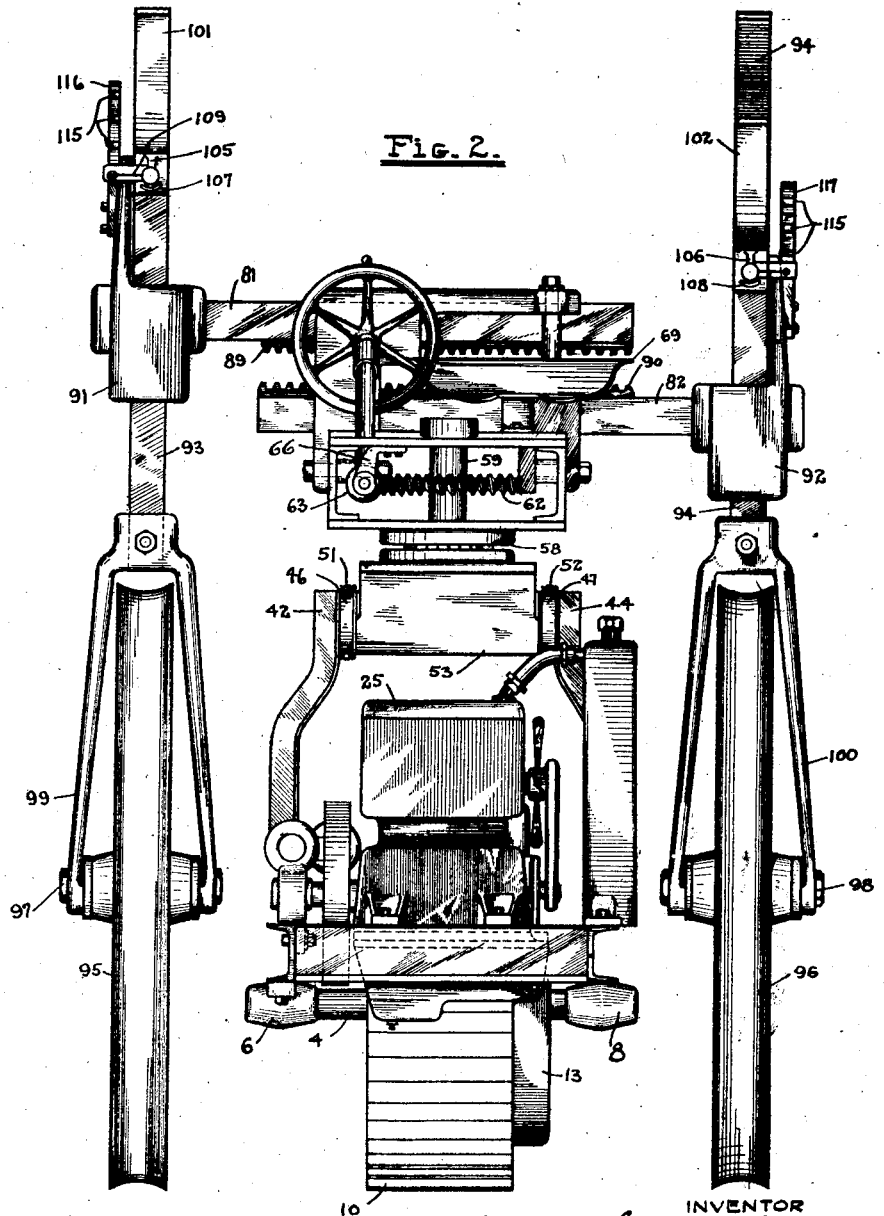

June 28, 1927.
H. C. HUBBELL
1,633,743
TRACTOR
Filed March 10, 1922
6 Sheets-Sheet 3
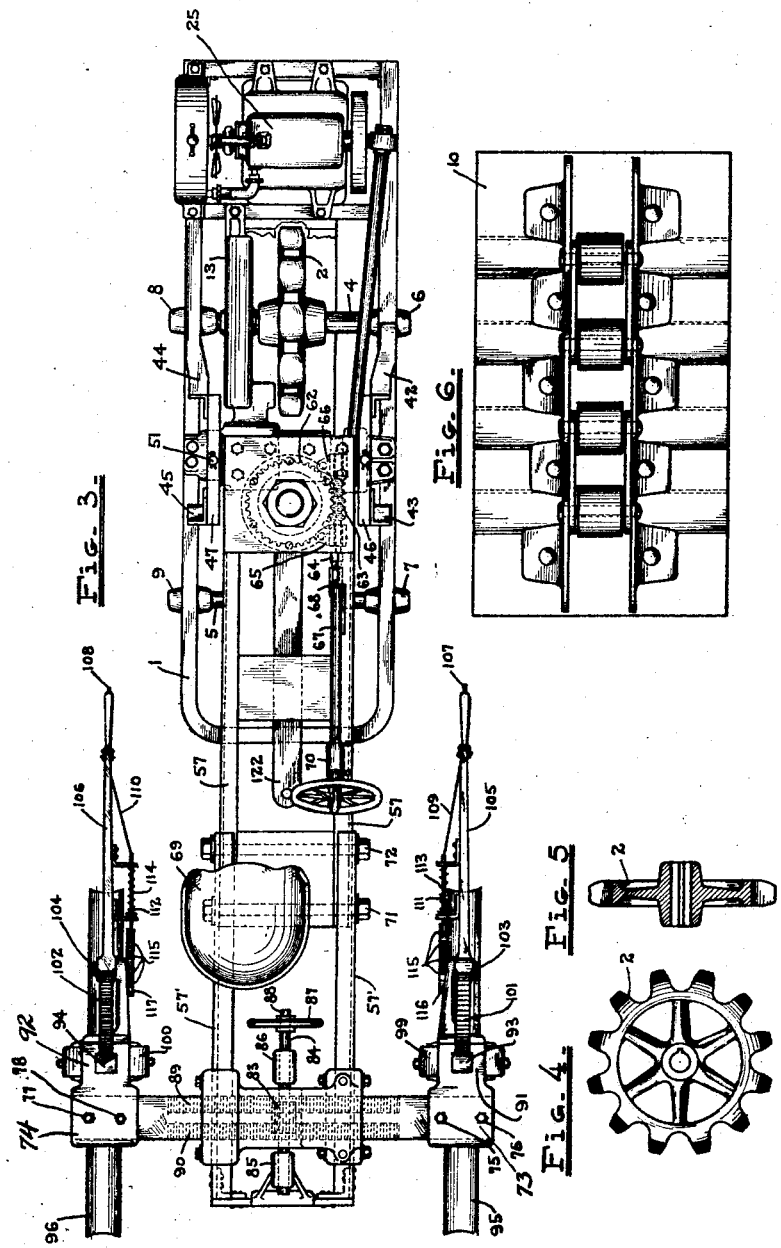
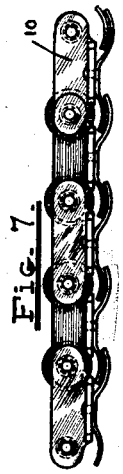
INVENTOR
Harvey C. Hubbell
BY James N. Ramsey
ATTORNEY June 28, 1927.
H. C. HUBBELL
TRACTOR
Filed March 10, 1922     6 Sheets-Sheet 4
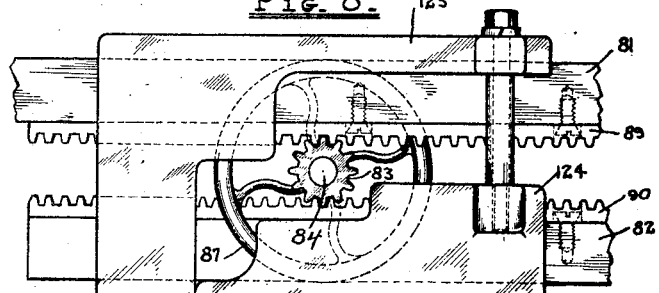
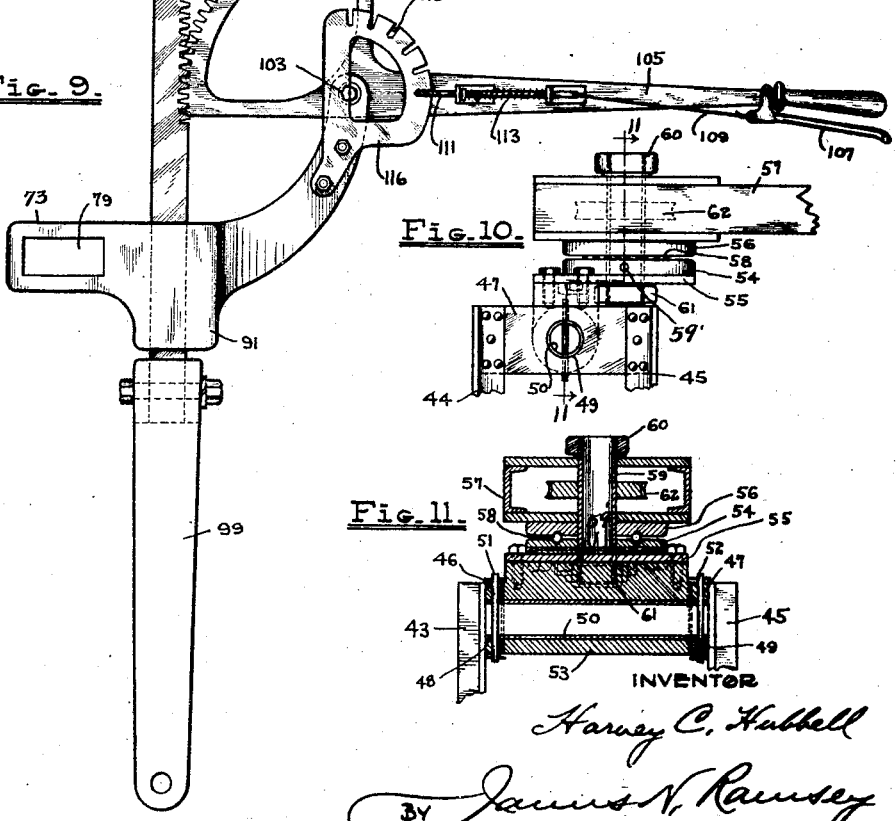

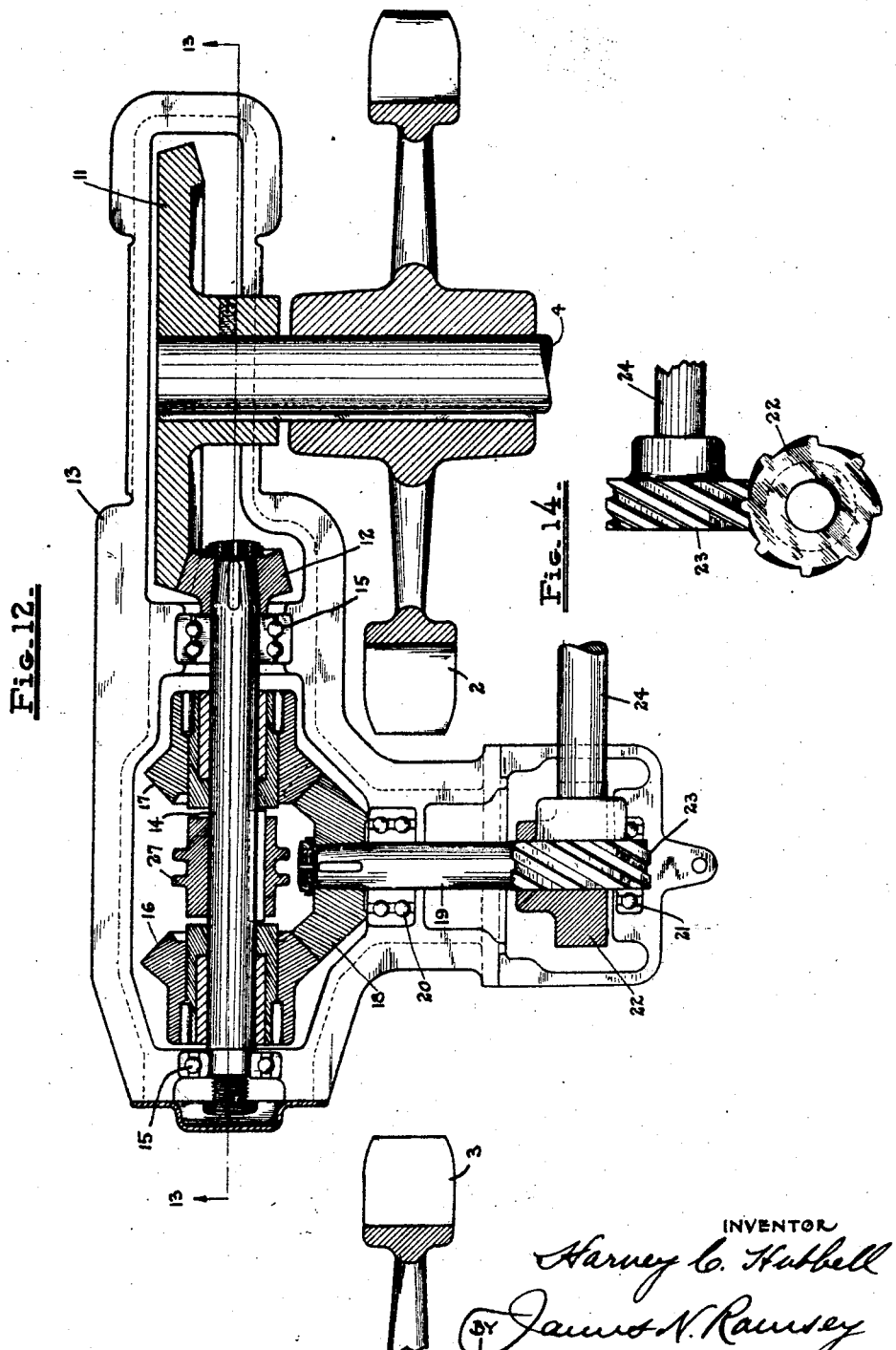

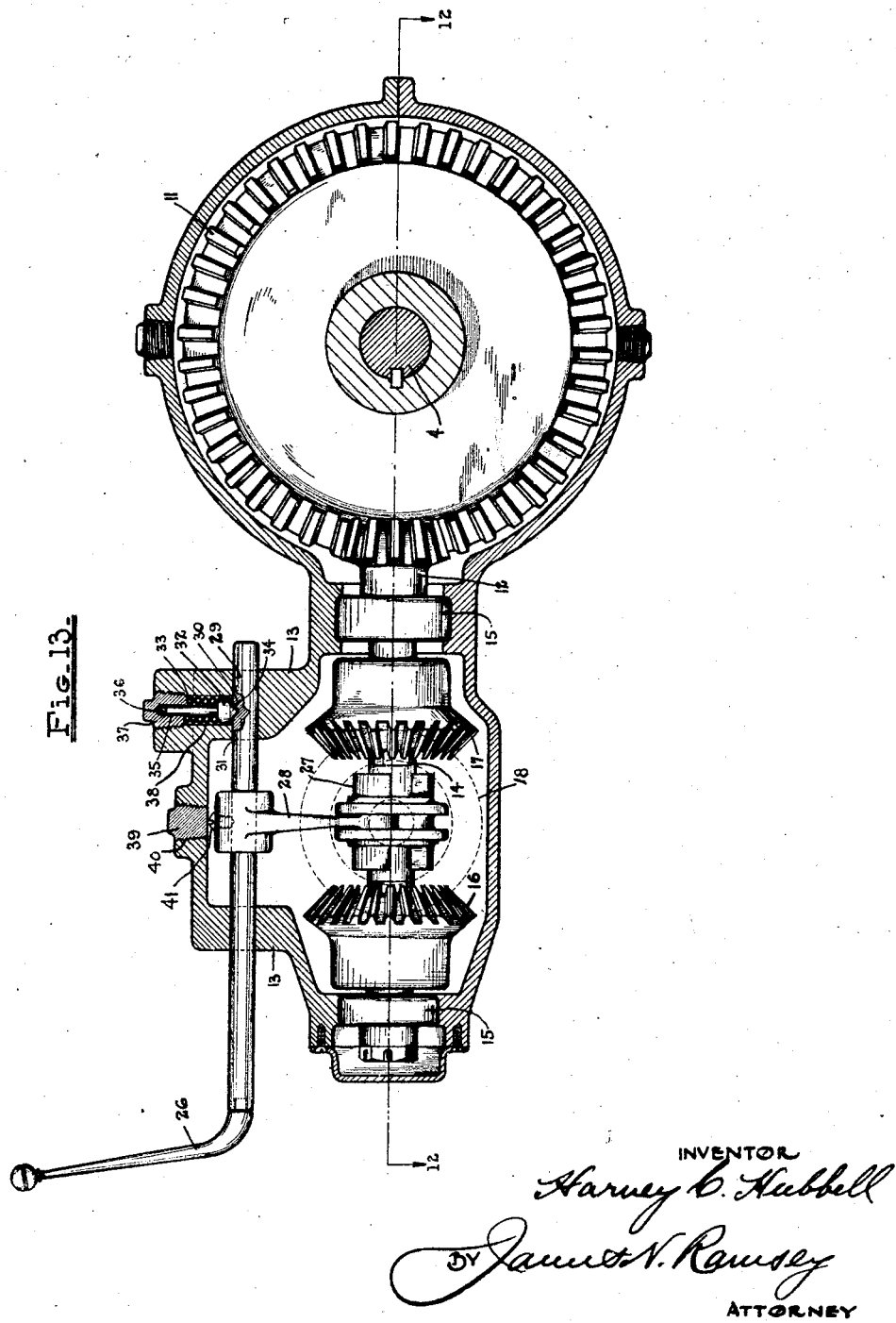

Patented June 28, 1927.

1,633,743

UNITED STATES PATENT OFFICE.

HARVEY C. HUBBELL, OF CINCINNATI, OHIO.

TRACTOR.

Application filed March 10, 1922. Serial No. 542,644.

My invention relates to tractors for general use and more particularly to tractors adapted for various adjustments of positions of the wheels relative to each other and to the chassis for use in plowing, cultivating, and other allied uses.

The objects of my invention are to provide adjustable means for conveniently and quickly regulating the positions of the wheels relative to each other whereby the front or tractor wheels, set in tandem, have been located at one side of a row or between rows of growing corn, vegetables and the like, and whereby the rear wheels will span or go between rows without damage thereto.

Another object of my invention is to provide means whereby the tractor may be adjusted to maintain a horizontal position under varying conditions in the surface traversed.

Another object of my invention is to mount the engine in front of the tractor wheels in order to secure greater tractive power and for the same reason the tractor wheels are placed in front instead of in the rear. The purpose of applying power to the front tractor wheel is that the tractor proper profits by the resistance due to this power. When the front wheel is driven the result of my application of power is such as to cause a downward thrust on the chassis supporting the tandem wheels thereby delivering mechanical weight for downward thrust on the tread through the tandem or tractor wheels.

Another object of my invention is to arrange the front wheels in tandem in order to facilitate the turning of the tractor without the use of differential and thereby increasing easy control of the steering.

Another object of my invention is to provide a construction which enables the operator to use the machine on soft, sandy or muddy ground.

Another object of my invention is a unique method of holding said tractor in vertical position by novel connection of rear stabilizer wheels through the medium of a frame or chassis connected to a plate on a fifth wheel which is mounted on suitable bearings thereby providing leverage sufficient that the machine is at all times under proper control with reference to vertical position.

Another object of my invention is to simplify and improve the construction and arrangement of parts whereby more efficient results are obtained as herein more fully set forth. Various other objects and advantages are obtained as herein set forth.

My invention consists in the novel combination and arrangement of parts and in the details of construction as herein set forth and claimed.

In the drawings:

Fig. 2 is a front elevation;

Fig. 3 is a plan view with parts of the tractor chain omitted so as to show the front tandem wheel in relation to the power plant;

Fig. 4 is a side elevation of the tractor sprocket wheel;

Fig. 5 is a vertical section thereof;

Fig. 6 is a plan view of a portion of the tractor chain;

Fig. 7 is a side elevation thereof;

Fig. 8 is a rear elevation of the upper portion of the mechanism for regulating the distance between the rear wheels;

Fig. 9 is an enlarged side elevation of a means for vertically adjusting the rear wheels whereby a horizontal position of the machine is maintained when passing over irregular or inclined surfaces;

Fig. 10 is an enlarged side elevation of the pivot mechanism for permitting the tandem wheels to assume varying positions in relation to each other as well as permitting laterally turning movement of said wheels;

Fig. 11 is a vertical section taken on the line 11—11 of Fig. 10;

Fig. 12 is an enlarged horizontal section taken on a plane corresponding to the line 12—12 of Fig. 13 showing parts in elevation;

Figure 1:
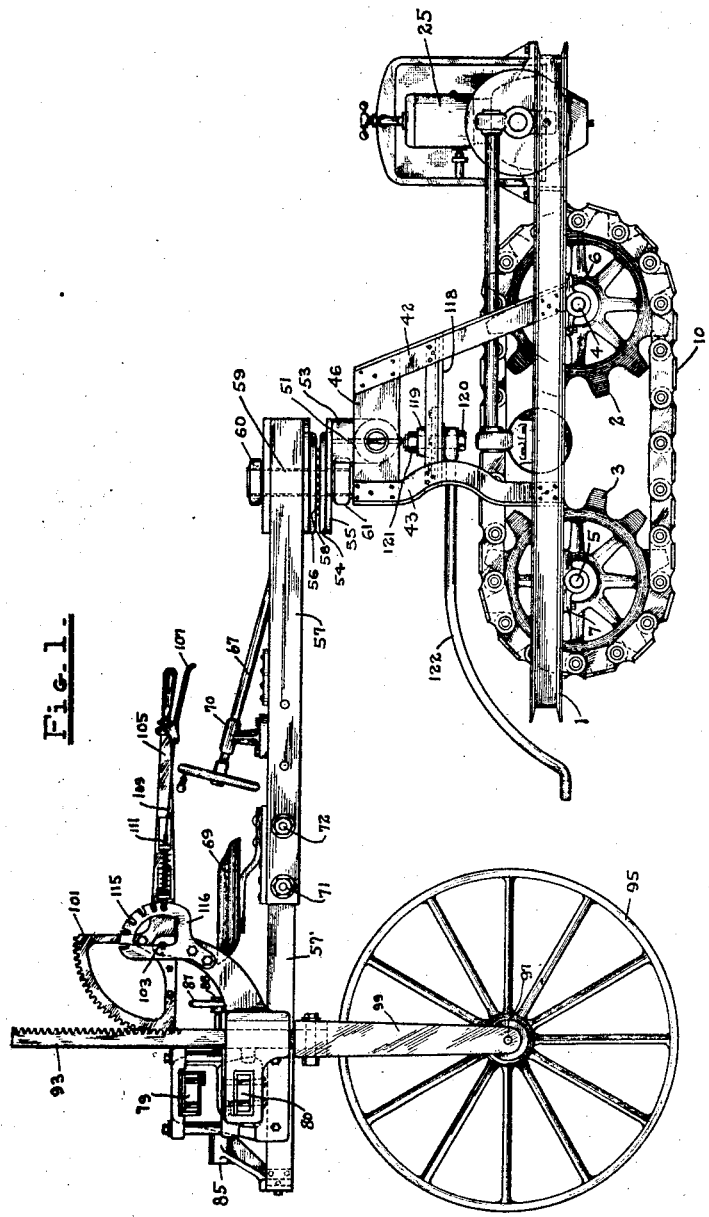
Fig. 1 is an elevation showing the right side of the tractor.

Fig. 13 is an enlarged vertical longitudinal section taken on a plane corresponding to the line 13—13 of Fig. 12, and showing parts in elevation; and Fig. 14 is an elevational view of spiral gears 19 and 20.

In the embodiment of my invention as illustrated and which shows a preferred construction the frame or chassis of the tractor comprises a channel iron frame 1 supported by front tractor wheels 2 and 3, in tandem, mounted upon axles 4 and 5 respectively rotating in suitable bearing blocks 6 and 7 and 8 and 9 respectively securely attached on the bottom of frame 1.

The traction power is applied to the surface of the ground by means of a tread chain 10 passing over the front tractor driving wheel 2 also over idler tractor wheel 3 by power applied to said front tractor wheel 2 by means of suitable bevel gear 11 and pinion 12 (Fig. 13) enclosed in transmission housing 13 with shaft 14 rotating on ball bearings 15 operatively connecting them with the transmission mechanism illustrated in Figs. 12 and 13 in which bevel gears 16 and 17 respectively are mounted on shaft 14. Bevel gears 16 and 17 mesh with bevel gear 18 at all times. Said bevel gear 18 is fixedly mounted on one end of countershaft 19 supported by bearings 20. The other end of countershaft 19 is mounted in bearing 21 and has spiral gear 22 fixedly mounted on said shaft. Spiral gear 22 meshes with similar gear 23 fixedly mounted on one end of main driving shaft 24, the other end of which is connected to motor 25 by means of suitable gears. The gear shifting lever 26 controlling clutch 27 by means of yoke 28 forms either a neutral position or engages with either of driving gears 16 or 17, thereby permitting forward or reverse driving of the tractor.

Gear shift lever 26 is provided upon its upper side with three recesses, 29, 30 and 31 to receive stop 32 actuated by spring 33. Said stop has a tapered head 34 adapted to seat in any of said recesses and is provided with a shank or stem 35 fitting socket 36 of screw plug 37 which is inserted in bore 38 of transmission housing 13. This permits gear operating shaft to be moved longitudinally and to automatically engage in any of the three positions indicated. It is shown in neutral position in Fig. 13. To throw clutch 27 into engagement with bevel gear 17 merely push lever 26 forward until head 34 engages recess 29 and to throw it into engagement with bevel gear 16, pull lever 26 in the reverse direction until head 34 engages recess 31. Screw plug 39 is provided to close opening 40 which permits access to set screw 41 and also for filling the case with oil.

Vertical angle iron struts 42, 43, 44 and 45 are secured to frame 1 at their lower ends and at their upper ends to connecting plates 46 and 47 which are provided with holes 48 and 49 which receive hollow journal tube 50. Said tube is fixed to said connecting plates by pins 51 and 52 respectively, and is journaled in mounting 53 pivotally mounted therein to provide for vertically oscillating movement of the frame on which the tractor and stabilizer wheels respectively are mounted.

The fifth wheel comprises lower part 54 fixed on shelf 55 secured on mounting 53, and the upper part 56 of said wheel is attached to the lower part of the front end of stabilizer frame 57. Members 54 and 56 are grooved and spaced apart from each other by balls 58 in said grooves forming a ball bearing pivot. A vertical tubular coupling pin 59 is pivotally mounted in stabilizer frame 57 and is supported therein by collars 60 and 61. Said pin 59 is fixedly attached at its lower end to member 54 by bolt 59' and to shelf 55.

The steering mechanism comprises a worm gear 62 securely attached to tubular coupling pin 59 and in mesh with worm 63 securely attached to shaft 64 journaled in horizontal position by brackets 65 and 66 and connected to steering rod 67 by universal coupling 68. The steering rod 67 is held in an inclined position in front and to one side of operator's seat 69, near the center of machine by support 70. The front part of stabilizer frame 57 is also provided with bolts 71 and 72 which extend through the rear part of stabilizer frame 57 and provides means for lengthening or shortening said frame. The rear part of stabilizer frame 57 is connected to longitudinal members 57' on which is carried the stabilizer wheels 95 and 96 supported by rack guides 73 and 74 held in place by bolts 75, 76, 77 and 78 and provided with slots 79 and 80 to accommodate wheel adjusting rack mountings 81 and 82 in mesh with pinion 83 fixed on shaft 84 for the purpose of adjusting rear wheels 95 and 96 transversely relative to each other. Shaft 84 is journaled in brackets 85 and 86 and has handwheel 87 attached and held in place thereon by nut 88.

Referring to Figs. 1, 2, 3 and 8 guide supports 123 and 124 are secured on the rear end of stabilizer frame 57' by bolts 125 and 126 and are provided with guide ways 127 and 128 in which are suitably mounted wheel adjusting mountings 81 and 82 respectively and racks 89 and 90 respectively which racks are spaced apart from each other to receive actuating pinion 83 which engages each of said racks.

On the bottom at one edge of rack mounting 81 is attached rack 89 by bolts or other suitable means which rack is approximately one-third of the width of said rack mounting 81 and on the top of the opposite edge of rack mounting 82 is attached by bolts or other suitable means a similar rack 90 covering approximately one-third the area of said surface of rack mounting 82. Pinion 83 is adapted to engage either rack 89 or 90 separately or simultaneously by merely pushing shaft 84 lengthwise by hand wheel 87. Rack mountings 81 and 82 are provided with brackets 91 and 92 which carry racks 93 and 94 for vertical adjustment of rear stabilizer wheels 95 and 96 which turn on axles 97 and 98 supported by forks 99 and 100 respectively or other suitable mountings. Toothed gear sectors 101 and 102 are pivoted to brackets 91 and 93 by means of stub bolts 103 and 104. Racks 93 and 94 are raised or lowered by means of toothed gear sectors 101 and 102. Toothed gear sectors 101 and 102 are provided with hand levers 105 and 106 for raising or lowering said racks 93 and 94 thus raising or lowering said stabilizer wheels either separately or simultaneously. Hand levers 105 and 106 are provided with gripping devices 107 and 108 respectively and rods 109 and 110 respectively connected to drop pins 111 and 112 respectively which by means of springs 113 and 114 respectively engage slots 115 in quadrants 116 and 117 respectively to receive drop pins 111 and 112, said quadrants thus preventing hand levers 105 and 106 from moving while the tractor is in operation. Said quadrants 116 and 117 are suitably fixed to brackets 91 and 92.

A bearing plate 118 is horizontally attached to struts 42, 43, 44 and 45 through which is mounted a hub bearing 119 having journaled therein axle bolt 120 secured by nut 121 and to which is pivotally mounted the front end of draw bar 122 which extends backwardly and downwardly between the front and rear wheels to which a plow or other implement may be readily attached. This pivotally mounted draw bar permits the front tractor wheels to be turned without resistance due to draft of plow or other implement attached thereto and without affecting the action of the plow or other implement in its forward operation.

What I claim as new and desire to secure by Letters Patent is:

1. In a power driven tractor, rear and front frames, struts mounted on said front frame, a fifth wheel connected to said struts, a fulcrum horizontally mounted in said struts and pivotally supporting said fifth wheel whereby the front driving members and frame are adapted to assume varying positions in relation to said rear frame.

2. In a tractor, a rear upper frame, tread means adapted to support the rear of said rear frame, a fifth wheel mounted under the front end of said rear frame, struts supporting said fifth wheel, a pivoted connection between said struts and said fifth wheel, tandem wheels and means for communicating power from the engine to the front tandem wheel, substantially as set forth and for the purposes specified.

3. A tractor having a rear frame, tread means supporting said rear frame, a front frame, tread means supporting said front frame, struts on said front frame, connecting plates rigidly supported by said struts, a fifth wheel mounted on said connecting plates, a coupling pin on which said fifth wheel is mounted, a worm gear on said coupling pin, a worm meshing with said worm gear, a shaft attached to said worm, a steering rod, a universal joint connecting said shaft and said steering rod and means for turning said steering rod thereby turning the front tread members to the right or left.

4. In a tractor, a fifth wheel having upper and lower parts, a coupling pin journaled in the upper part of said fifth wheel and fixed in the lower part thereof, a worm gear on said coupling pin, a worm meshing with said worm gear, a steering shaft, a universal joint connecting said worm and said steering shaft and means for operating said steering shaft.

5. In a tractor, a rear frame, brackets fixed on said rear frame, a vertical rack slidably mounted in each bracket, a fork secured to each rack and a rear stabilizer wheel mounted in each fork and adapted to support the rear of said tractor, a toothed sector pivotally mounted on each bracket, a quadrant mounted on each bracket, a handle adapted to move each sector and a stop adapted to engage its quadrant to hold its sector in adjusted position whereby the rear of said tractor frame may be vertically adjusted and held in varying positions.

6. In a tractor, a stabilizer frame, guide supports mounted thereon and each having a guide way therein, a rack in each guide way, a pinion adapted to mesh with both of said racks simultaneously or separately and means for adjusting said pinion for engagement with either one or both of said racks as desired whereby either one or both of the stabilizer wheels may be adjusted toward or from each other as desired.

7. In a tractor, a front frame, tractor wheels supporting said front frame, a stabilizer frame, stabilizer wheels supporting said stabilizer frame, struts mounted on said front frame, a fifth wheel mounted on said struts and forming a pivotal connection with said stabilizer frame and a draw bar pivotally mounted on said struts, whereby a short turn is effected by the tandem wheels without resistance due to draft of plow or other implement without affecting the forward operation of any implement attached to said draw bar.

8. In a power driven tractor of the character described, a frame, stabilizer wheels in parallel supporting the rear of said frame, tractor wheels in tandem supporting the front of said frame, a vertical rack fixed to each stabilizer wheel, a toothed sector engaging each rack, a pair of quadrants, and a handle for each toothed sector adapted to move the adjacent rack and engage the quadrants whereby said stabilizer wheels may be moved toward or from the adjacent chassis frame vertically and held in adjusted positions, substantially as set forth and for the purposes specified.

HARVEY C. HUBBELL.